United States Patent
Doane et al.

(10) Patent No.: US 6,518,944 B1
(45) Date of Patent: Feb. 11, 2003

(54) COMBINED CHOLESTERIC LIQUID CRYSTAL DISPLAY AND SOLAR CELL ASSEMBLY DEVICE

(75) Inventors: J. William Doane, Kent, OH (US); Nick M. Miller, IV, Rootstown, OH (US); Donald James Davis, Conneaut Lake, PA (US)

(73) Assignee: Kent Displays, Inc., Kent, OH (US)

( * ) Notice: Subject to any disclaimer, the term of this patent is extended or adjusted under 35 U.S.C. 154(b) by 0 days.

(21) Appl. No.: 09/427,137

(22) Filed: Oct. 25, 1999

(51) Int. Cl.[7] .................................................. G09G 3/36

(52) U.S. Cl. .......................... 345/87; 349/113; 349/115; 349/116

(58) Field of Search ............................ 345/87, 204–205, 345/211, 94–95; 349/115, 116, 175, 179, 169, 113; 126/595; 353/122

(56) References Cited

U.S. PATENT DOCUMENTS

| | | |
|---|---|---|
| 4,023,088 A | 5/1977 | Fowler ........................ 322/2 R |
| 4,083,356 A | 4/1978 | Rafogopal ................... 126/595 |
| 4,095,217 A | 6/1978 | Tani et al. ................... 345/851 |
| 4,139,279 A | 2/1979 | Laesser et al. .............. 349/115 |
| 4,940,313 A | 7/1990 | Hamatani ................... 349/116 |
| 5,153,760 A | 10/1992 | Ahmed |
| 5,453,863 A | 9/1995 | West et al. .................... 349/35 |
| 5,515,304 A | 5/1996 | Ishii et al. |
| 5,590,944 A | 1/1997 | Stokes |
| 5,748,277 A | 5/1998 | Huang et al. ............... 349/169 |
| 5,933,203 A | 8/1999 | Wu |
| 5,990,995 A | * 11/1999 | Ebihara et al. ............. 349/113 |

OTHER PUBLICATIONS

*Practical Photovoltaics Electricity From Solar Cells*, Richard J. Comp, Ph.D., ISBn #0–937948–11–X, Chapter 6 Entitled New Developments in Photovoltaic Technology, pp. 107–124, Aatec Publications, copyright 1995.

(List continued on next page.)

*Primary Examiner*—Richard Hjerpe
*Assistant Examiner*—Frances Nguyen
(74) *Attorney, Agent, or Firm*—Watts Hoffmann Fisher & Heinke (57) ABSTRACT

The present invention is directed to an integrated, reflective bistable, cholesteric liquid crystal display and solar cell assembly providing electrical energy to power display electronics. The liquid crystal display includes the layer of cholesteric liquid crystal material sandwiched between first and second transparent substrates. An inner surface of the first substrate and an inner surface of the second substrate bound the layer of liquid crystal material and the first substrate is closest to a viewer of the display. A first set of conductive electrodes is disposed on the inner surface of the first substrate and a second set of conductive electrodes is disposed on the inner surface of the second substrate. Display driver circuitry is electrically coupled to the first and the second sets of conductive electrodes for generating desired voltage differentials between electrodes of the first set of conductive electrodes and electrodes of the second set of conductive electrodes. A solar cell assembly that is provided includes a solar cell or solar panel positioned behind the second substrate and electrically coupled to a rechargeable energy storage device, such as a rechargeable battery. The solar cell receives illumination passing through the first substrate, liquid crystal material and the second substrate and converts the illumination incident on the solar cell to electrical energy to supply power to the rechargeable energy storage device. The cholesteric liquid crystal material permits transmission of incident light regardless of the configuration of the liquid crystal material.

50 Claims, 7 Drawing Sheets

OTHER PUBLICATIONS

"Amorphous Silicon Thin–Film Transistor Active–Matrix Reflective Cholesteric Liquid Crystal Display," by J.Y. Hahm, T. Goda, B.H. Min, T.K. Chou, J. Kanicki, X.Y. Huang, N. Miller, V. Sergan, P. Bos and J.W. Doane, *Proceedings of the 18th International Display Research Conference Asia Display 98*, Jin Jang, ed., pp. 979–982, Society for Information Display & the Korean Physical Society, copyright 1998.

"A High Reflective LCK with Double Cholesteric Liquid Crystal Layers," by Y. Kawata, H. Yamaguchi, T. Oka, M. Mori, H. Kobayashi, N. Kamiura, T. Hioki, K, Taira, H. Okumura, M. Akiyama and K. Suzuki, Materials a& Devices Laboratories, Toshiba Corporation, Yokohama, Japan, *Conference Record of the 1997 International Display Research Conference and International Workshops on LCD Technology and Emissive Technology* sponsored by The Society for Information Display, based on papers presented at Sheraton Centre Toronto, Toronto, Canada, Sep. 15–19, 1997.

"Confab sees rise in photovoltaic usage," by G. Robinson and "Photovoltaics progress spawns thermal, chemical spinoffs," by C. Brown, Electronic Engineering Times, Oct. 1997, pp. 35–36.

PCT International Search Report of Oct. 16, 2000, 1 page.

\* cited by examiner

COMBINED CHOLESTERIC LIQUID CRYSTAL DISPLAY AND SOLAR CELL ASSEMBLY DEVICE

FIELD OF THE INVENTION

The present invention relates to liquid crystal display device which functions both as a cholesteric reflective flat-panel display and a solar cell assembly to provide electrical energy to power the display and associated electronics and, more particularly, to a liquid crystal display device including a passive matrix, bistable, cholesteric liquid crystal display having one or more solar cells disposed in alignment with the display and adjacent a substrate bounding a layer of cholesteric liquid crystal material, the one or more solar cells providing electrical energy to power display electronics.

BACKGROUND OF THE INVENTION

Typically, a reflective liquid crystal display comprises a single layer of liquid crystal material sandwiched between adjacent inner surfaces of generally planar substrates. In matrix type liquid crystal displays, on the inwardly facing surface of one of the substrates is disposed a set or array of parallel column electrode segments (column electrodes) and on an inwardly facing surface of the other of the substrates is a set or array of parallel row electrode segments (row electrodes), extending generally perpendicular to the column electrodes. The row and column electrode segments (also referred to as "row and column electrodes") are spaced apart by the thin layer of liquid crystal material. Display picture elements or pixels are defined by regions of liquid crystal material adjacent the intersection of the row and column electrode segments.

Upon application of a suitable electric field, a pixel of a display will assume either a reflective or a non-reflective state. A pixel, $P(x_i, y_j)$, formed at the overlapping or intersection of the ith row electrode segment and the jth column electrode segment is subject to an electric field resulting from the potential difference between a voltage applied to the ith row electrode segment and a voltage applied to the jth column electrode segment.

Recent advances in liquid crystal material research have resulted in the discovery of bistable cholesteric (also referred to as chiral nematic) liquid crystal display devices. Cholesteric liquid crystal display materials are able to maintain a given reflective state (reflective or nonreflective) without the need for the constant application of an electric field. In a reflective cholesteric liquid crystal display, the reflectivity of an image pixel depends upon the configuration or texture of the liquid crystal material (e.g., planar, focal conic, homeotropic configurations) defining the image pixel. Moreover, the state of the liquid crystal material may be changed upon imposing an appropriate electric field across the liquid crystal material for an appropriate period of time. This is accomplished by appropriately energizing the row and column electrodes defining an image pixel so as to generate an electric field having a desired magnitude (that is, a desired root mean square (rms) voltage) for a desired period of time. If the panel or substrate furthest from the viewer is painted with a black material, a pixel with a low reflectance or nonreflective state will appear as a black area to the viewer. A pixel in a high reflectance state will appear to the viewer as a visible colored area in the display.

Display driver circuitry is coupled to the vertical and horizontal electrodes. Operating under the control of a logic and control unit, the display driver circuitry energizes the row and column electrodes with appropriate voltage waveforms such that an appropriate voltage across each pixel is generated. The voltage across a pixel will either cause it to remain in its present state of reflectance or change its state of reflectance. The image generated by the display pixels may be modified by changing the state of selected pixels. In this way, text or image data can be presented for viewing on the display.

Certain prior art calculators and watches have included both a liquid crystal display and a solar cell assembly to provide electrical energy to the device electronics. However, in such devices, the display and the solar cell or cells have been disposed in different areas of the device, that is, the display area and the solar cell area do not overlap. This requires a device with a surface area large enough to accommodate both the solar cell area and the area of the display. This type of configuration is disadvantageous in small sized hand held devices were surface area is at a premium.

SUMMARY OF THE INVENTION

The present invention is directed to a cholesteric liquid crystal display utilizing a solar cell assembly as a power source for powering the display electronics. The display includes a front substrate, closest to a viewer, a back substrate and a thin layer of cholesteric liquid crystal material sandwiched therebetween. On an inner surface of the front substrate (that is, the surface of the substrate adjacent the liquid crystal material) is disposed a set or array of electrode segments and on an inner surface of the back substrate is a set or array of electrode segments, extending generally perpendicular to the column electrode array. In one configuration of the present invention, the display is a matrix display and one set of electrode segments comprises a set of parallel row electrode segments and the other set of electrode segments comprises a set of parallel column electrode segments. The row and the column electrode segments are substantially orthogonal. This arrangement of perpendicular row and column electrodes results in an orthogonal pattern of image pixels (orthogonal display). It should also be appreciated that the present invention is equally suited to providing power to other types of liquid crystal displays in addition to orthogonal displays such as, for example, segmented displays. While a segmented display also includes electrodes which may be fabricated in various shapes and disposed in orthogonal or non-orthogonal orientations to generate desired image configurations. For example, in a segmented liquid crystal display electrode segments may advantageously be disposed to create a seven segment numerical display. In other segmented displays, electrode segments of irregular shape may be used to generate an icon on the display. Moreover, it should additionally be appreciated that the concept of the present invention of using a solar cell assembly in a cholesteric liquid crystal display to provide power to display electronics is equally applicable to active matrix cholesteric liquid crystal displays in addition to passive matrix cholesteric liquid crystal displays. An actively driven matrix cholesteric liquid crystal display is one in which where each of the image pixels is driven individually by an active circuit component, e.g., a transistor. An active matrix Ch-LCD is disclosed in an article entitled "Amorphous Silicon Thin-Film Transistor Active-Matrix Reflective Cholesteric Liquid Crystal Display," authored by J. Y. Nahm, T. Goda, B. H. Min, T. K. Chou, J. Kanicki, X. Y. Huang, N. Miller, V. Sergan, P. Bos and J. W. Doane and published in the Proceedings of the 18th International Display Research Conference, Seoul, Korea, September 1998, pages 979–982. The aforesaid active matrix Ch-LCD article is incorporated herein in its entirety by reference.

In one embodiment of an orthogonal Ch-LCD, display drive electronics include a set of row driver electronics electrically coupled to the row electrode segments that controls energization of all of the row electrodes and a set of column driver electronics electrically coupled to the column electrode segments that controls energization of all of the column electrode segments in the plurality of sets of column electrodes. The sets of row and column driver electronics constitute a single set of drive electronics.

The cholesteric or chiral nematic liquid crystal material is unique and advantageous in that it permits illumination incident on the display to pass through the liquid crystal material and impinge upon the solar cell. Typical nematic liquid crystal material displays such as twisted nematic (TN) or supertwisted nematic (STN) are dissimilar in that they function as a light shutter wherein light that passes through the nematic material is reflected toward the viewer by a reflector in back of the layer of nematic material. However, cholesteric liquid crystal material permits a percentage of incident radiation to pass through the liquid crystal material whether the material is in its highly reflective state (corresponding to the twisted planar configuration of the material) or in its low reflectance state (corresponding to focal conic configuration), or any state therebetween. Radiation that passes through pixels of the display in the focal conic state is absorbed by a black layer at the back of the display for providing contrast with light reflected from pixels in the reflective twisted planar state.

The cholesteric liquid crystal display (Ch-LCD) technology, be it an active matrix, passive matrix or segmented display, is ideal for the incorporation of a solar cell assembly in that most of the light incident on the display is available for generating electrical energy. This is not true for other reflective liquid crystal display technologies where only a few percent, if any, is available. In a Ch-LCD, the incident light is reflected by the liquid crystal material itself. In the reflective state, incident light is decomposed into its right and left circular components with only one of the components or 50% of the light being reflected. The other circular component of incident light passes through the liquid crystal material. A monochrome Ch-LCD therefore only reflects 50% of one color with a bandwidth of about 100 nanometers (nm.), the rest of the visible light, i.e., the other colors and the other non-reflected circular component are available for conversion to electrical power by the solar cell assembly. All of the incident light that passes though the cholesteric liquid crystal material can be equal to about 75% of incident light (or incident light intensity) for a monochrome Ch-LCD. Even in a full color Ch-LCD, which is comprised of stacked liquid crystal cells, those colors that are not being reflected in a particular image pixel are available for conversion to electrical power by the solar cell assembly and in such Ch-LCDs, about 65% to 75% of the incident light can be available for conversion to electrical energy by the solar cell assembly, depending on the image.

The cholesteric Ch-LCD display of the present invention advantageously utilizes the solar cell assembly in contrast to twisted nematic (IN), supertwisted nematic (SIN), ferroelectric (FLC) and other liquid crystal displays which use polarizers to generate an image on the display. In such displays that make use of polarizers, 50% of the incident light is absorbed by a polarizer and not available for conversion to electrical power. Also, such displays use a mirror on the backplane or back substrate to reflect the incident light (as opposed to the cholesteric liquid crystal material reflecting a specific color) and that reflected light is similarly not available for conversion to electrical power. Likewise, guest host type liquid crystal displays absorb light not being reflected and are, therefore, unsuitable for advantageously utilizing a solar cell assembly to supply power to the display electronics.

Cholesteric liquid crystal displays also have another advantage over other display technologies in that they possess bistable memory and do not require any electric power at all to maintain an image on the display, electric power is only required to change the image, i.e., change the reflective state of selected image pixels. Liquid crystal displays utilizing TN and STN technologies need to be refreshed about 60 times per second to maintain an image on the display. In devices that are not required to show moving video images, the power consumption is substantially less in Ch-LCDs than other liquid crystal technologies. Thus, electrical energy provided by a solar cell assembly theoretically does not have to be "used" to refresh the display image if the image does not change, instead, such electrical energy is available for powering other electronics of the display.

The foregoing features make Ch-LCD uniquely advantageous for utilizing a solar cell assembly. The combination of LCD and solar cell assembly is especially attractive for hand held and other portable devices wherein the combination of Ch-LCD and solar cell assembly will facilitate size reduction of the device.

In a first preferred embodiment of the present invention, a light absorbing solar panel assembly comprising one or more solar cells is affixed to the outer surface of a transparent back substrate (that is, the surface of the back substrate away from the liquid crystal material). This approach is useful for solar cells whose front surface is an appropriate black or dark color as to provide contrast for pixels in the focal conic configuration (low reflectance state). Preferably, a thin layer of index matching optical material is applied between the solar panel assembly and the back substrate to provide suitable optical coupling and to reduce reflections at the substrate/solar cell interface.

In a second preferred embodiment of the present invention, a visibly blackened or colored but infrared (IR) transmissive layer or coating comprising IR transmissive ink is applied to the outer surface of the back substrate and a light absorbing solar cell is affixed to the outer surface of the back substrate, that is, the IR transmissive layer is sandwiched between the outer surface of the back substrate and the solar cell. The IR transmissive layer is provided upstream of the solar cell to ensure proper contrast in the event that a solar cell having an undesirable reflectivity is used. The IR transmissive layer provides a dark background for pixels in the focal conic state and absorbs visible light (in the range of 0.38 to 0.78 micrometers ($\mu$m.)) but allows a majority of radiation having wavelengths in the near infrared range (typically 0.75 $\mu$m. to 1.5 $\mu$m.) as well as radiation of the middle and far infrared ranges (typically 1.5 $\mu$m. to 1000 $\mu$m.) and greater to be absorbed by the solar cell assembly.

In a third preferred embodiment of the present invention, the solar cell assembly of the display includes a solar panel assembly which functions as the back substrate or panel of the display. Advantageously, the solar panel assembly includes one or more solar cells comprising a plastic or glass base material with a solar radiation absorbing material coated or bonded on an outwardly facing surface of the base material. The opposite surface of the base material will include horizontally spaced apart ITO electrode segments affixed thereto such that the solar cell and the electrode segments share an opposite side of a common base material.

In a fourth preferred embodiment of the present invention, the display is a stacked reflective cholesteric liquid crystal display, for example a triple stacked display providing a color display an RGB (red, green and blue) color display with a solar cell assembly functioning as a back substrate or panel of the display. Alternately, the display could be a double stacked display offering the advantage of improved brightness for the pixels in the "on" or reflective state or for providing night vision capabilities.

In one aspect of the present invention, a liquid crystal display is disclosed comprising: a) a layer of chiral nematic liquid crystal material; b) first substrate and a spaced apart second substrate, an inner surface of the first substrate and an inner surface of the second substrate bounding said liquid crystal material layer, the first substrate being closer than the second substrate to a viewer of the display; c) a first set of conductive electrodes disposed on the inner surface of the first substrate and a second set of conductive electrodes spaced apart from the first set of electrodes and disposed on the inner surface of the second substrate bounding said liquid crystal material layer; d) display driver circuitry electrically coupled to the first and the second set of conductive electrodes for generating desired voltage differentials between electrodes of the first set of conductive electrodes and electrodes of the second set of conductive electrodes; and e) a solar cell assembly including one or more solar cells electrically coupled in series and positioned adjacent said second substrate and electrically coupled to the display driver circuitry, the solar cell or cells receiving illumination passing through the first substrate and said liquid crystal material and converting the illumination incident on the solar cell or cells to electrical energy to supply power to the display driver circuitry.

The liquid crystal display includes an energy storage device coupled to and providing power to the display driver circuitry. The solar cell assembly is electrically coupled to and supplies power to the energy storage device. Preferably, the solar panel assembly, comprising one or more solar cells, is disposed adjacent an outer surface of the second substrate or, alternatively, comprises the second substrate, i.e., the solar cell is comprised of a plastic or glass material that functions as the second substrate.

In another aspect of the present invention, a liquid crystal display device is disclosed comprising chiral nematic liquid crystal material, cell wall structure communicating with liquid crystal material to form focal conic and reflective twisted planar textures that are stable in the absence of an electric field, a solar cell device for converting electromagnetic radiation that has passed through liquid crystal material into electrical energy, and means for applying an electrical field to liquid crystal material to place at least a portion into at least one of the focal conic and twisted planar textures.

These and other objects, features and advantages of the invention will become better understood from the detailed description of the preferred embodiments of the invention which are described in conjunction with the accompanying drawings.

DETAILED DESCRIPTION OF THE PREFERRED EMBODIMENT

Figure 1:
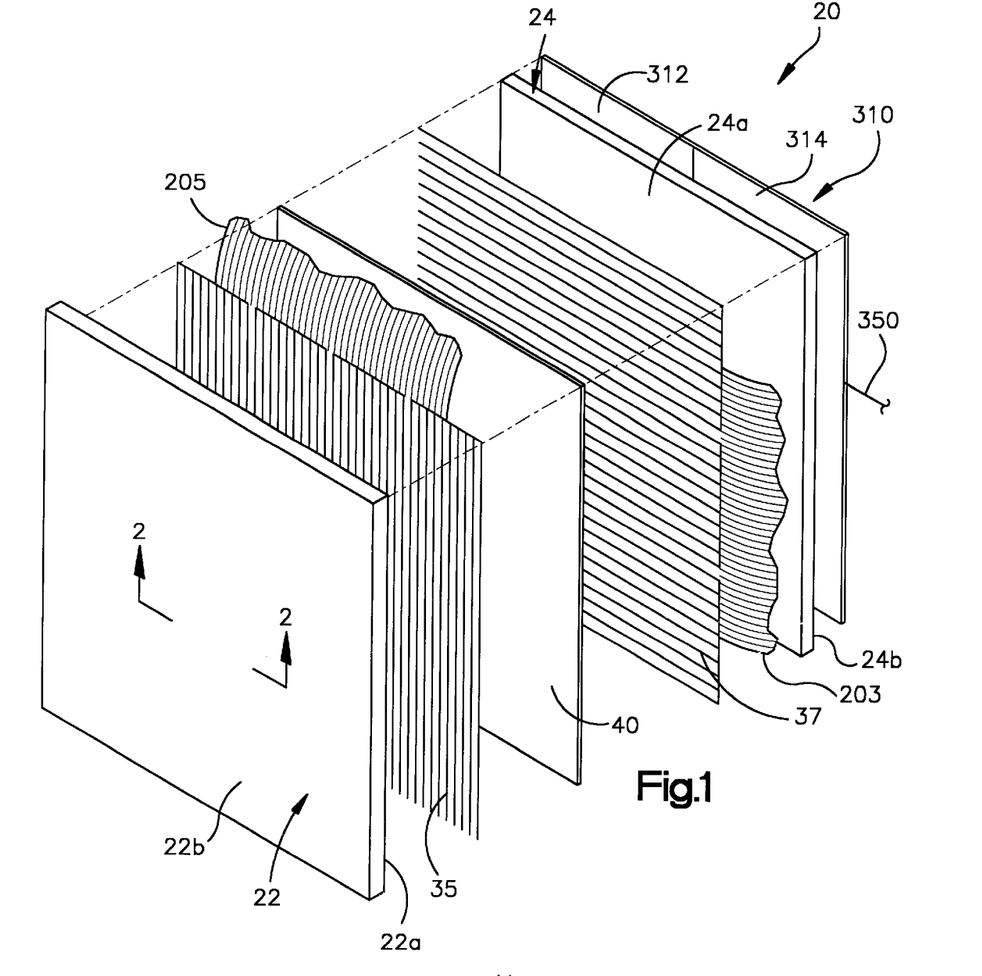
FIG. 1 is a schematic exploded perspective view of a first preferred embodiment of a bistable, cholesteric liquid crystal display and solar cell assembly of the present invention.
Figure 2:
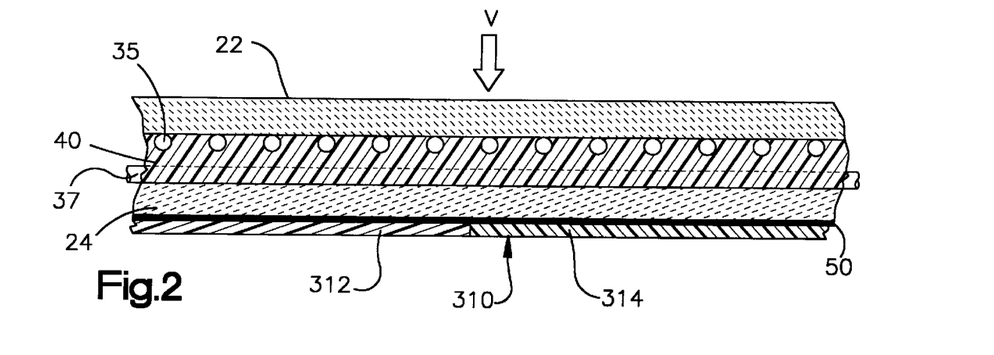
FIG. 2 is a sectional view of the display and solar cell assembly of FIG. 1 as seen from a plane indicated by the line 2—2 in FIG. 1.

Turning now to the drawings, the combination reflective liquid crystal display and solar cell assembly 20 (referred to hereinafter as "display") of the present invention includes a bistable, cholesteric liquid crystal display including a layer of cholesteric liquid crystal material 40 sandwiched between light transmissive substrates 22, 24 (FIGS. 1 and 2). The display 20 may be a passive matrix display or an active matrix display. Advantageously, the display 20 further includes a solar cell assembly 300 (shown schematically in FIG. 6) in alignment with the display to provide electrical energy to a rechargeable energy storage device 340 powering display driver circuitry 200 of the display 20. The solar cell assembly 300 includes a solar panel assembly 310 comprising a pair of solar cells 312, 314 electrically coupled in series. Each of the solar cells 312, 314 comprises a thin silicon photovoltaic cell that converts electromagnetic radiation directly into electrical energy.

Figure 6:
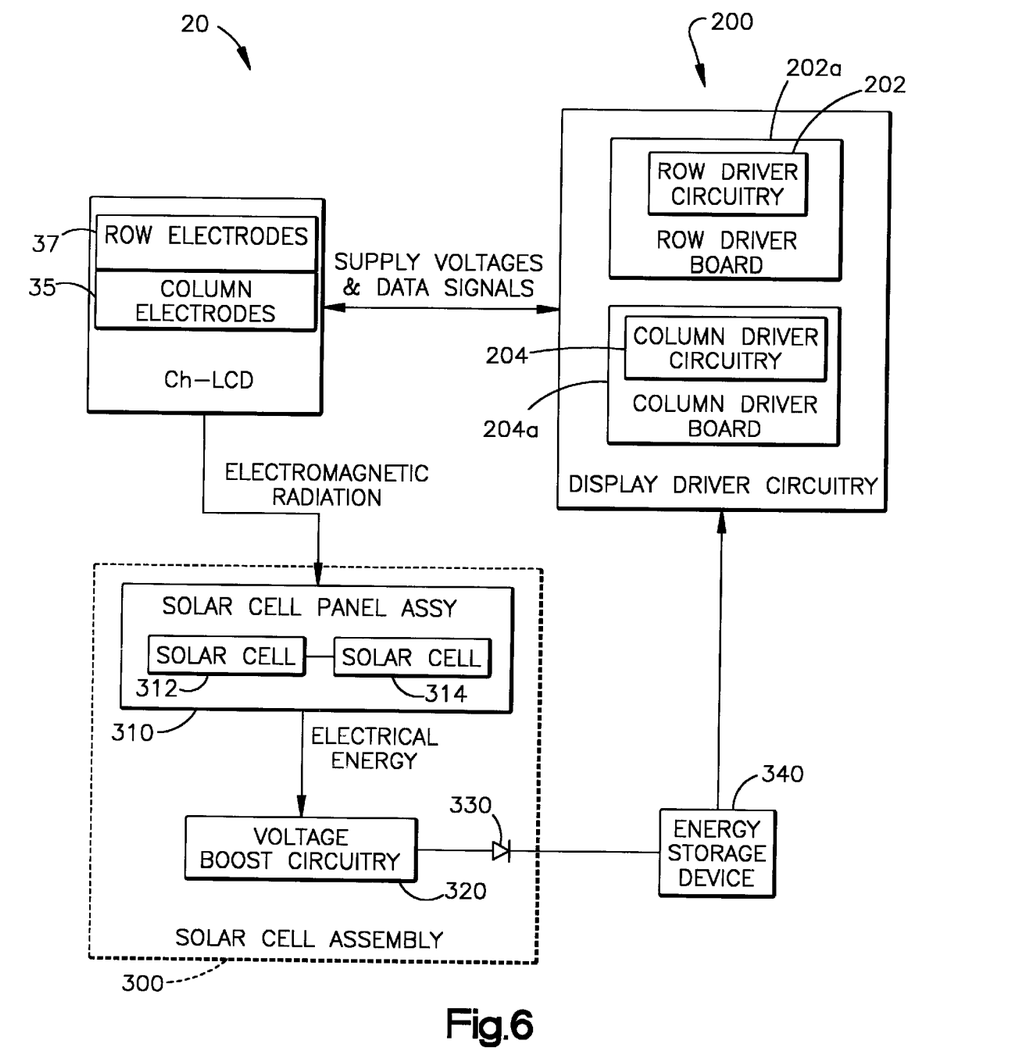
FIG. 6 is a schematic block diagram representation of the display driver and solar cell electronics of the display and solar cell assembly.

The energy generated by the solar cell assembly 300 provides charging power to the energy storage device 340 (schematically shown in FIG. 6). This increases the operational time of the display 20 between required charging of the energy storage device 340. Moreover, regardless of whether the display 20 is energized or not, the solar cell assembly 300 is operational in that it continues to charge or provide energy to the energy storage device 340. If the energy storage device 340 is fully charged the flow of electrical current from the solar cell assembly 300 to the energy storage device 340 will effectively drop to zero amps given that the output voltage of the solar cell assembly 300 is equal to or greater than the output voltage of the energy storage device 340 at full charge. Depending on the characteristics of the display 20, such as the size of the liquid crystal display area, the required updating speed of the displayed image (i.e. how often each image pixel is updated) and further depending upon the lighting conditions in which the display 20 is used, the solar cell assembly 300 may, in fact, provide sufficient power to the energy storage device 340 to operate the display 20 without the need for periodic recharging of the energy storage device via nonsolar methods, e.g., use of a AC/DC battery charger to charge the energy storage device. Even if the display 20 is not continuously operable on electrical power generated by the solar cell assembly 300 alone, the electrical power generated by the solar cell assembly 300 and input to the energy storage device 340 provides an extended operating time between energy storage device rechargings compared to not utilizing solar energy.

Important to the present invention is the fact that the display 20 uses a layer of cholesteric liquid crystal material 40 (also known as chiral nematic liquid crystal material) which is incident light transmissive (for purposes of reaching the solar cell assembly 300 thereby permitting the conversion of electromagnetic radiation to electrical power) regardless of the configuration of the liquid crystal material 40. This means that whether the liquid crystal material 40 is in the twisted planar configuration (light reflecting state) or in the focal conic state (non reflecting state) or in any configuration intermediate the reflective and non-reflective states (i.e., gray scale values intermediate reflective and non-reflective states as disclosed in U.S. Pat. No. 5,453,863, issued on May 4, 1993 and entitled "Multistable Chiral Nematic Displays," which is incorporated herein in its entirety by reference), at least a portion of the light incident on the liquid crystal material 40 is transmitted through the material to the solar cell assembly 300. For example, a cholesteric liquid crystal layer of a thickness of 5 micrometers ($\mu$m.) and first and second substrates 22, 24 subject to perpendicularly incident visible light transmits about 92% of the intensity of the incident light through the liquid crystal material and the substrates 22, 24 to the solar cell assembly 300 in the focal conic configuration (assuming approximately 4% reflection from each of the first and second substrates 22, 24). In the twisted planar configuration, approximately 75% of the intensity of the incident light passes through the liquid crystal material and the substrates 22, 24 to the solar cell assembly in the twisted planar configuration.

In contrast, twisted nematic (TN) or super twisted nematic (STN) liquid crystal material does not effectively transmit an appreciable proportion of incident visible light in all states of the material. Furthermore, cholesteric liquid crystal material also effectively transmits to the solar cell assembly 300 electromagnetic radiation having wavelengths in other than the visible light portion of the electromagnetic spectrum. For example, cholesteric liquid crystal material effectively transmits infrared radiation in the focal conic and twisted planar configurations at about the same percentages set forth above for visible light. Various types and amounts of suitable chiral nematic material, additives and substrate surface treatments, are disclosed in U.S. patent application Ser. No. 08/862,561, filed on May 23, 1997 entitled "Low Viscosity Liquid Crystal Material." Application Ser. No. 08/862,561 is assigned to the assignee of the present invention and is incorporated herein in its entirety by reference.

Overall Configuration of the Display 20

It should be appreciated that the concept of the present invention is not limited to any particular display size nor is it limited to a matrix or segmented display. In one typical example, the display 20 may be a VGA (video graphics array) sized liquid crystal display comprising 480 rows by 640 columns having a display viewing area of about 3.8 by 5 inches with 127 dots or pixels per inch (dpi) and is supported in a suitable housing (not shown) consisting of a high impact, durable plastic. The VGA size means that the display 20 comprises 307,200 image pixels (480 rows×640 columns). As noted above, it should be understood that the display 20 of the present invention may be fabricated in other that the VGA display size. While the display 20 is a matrix display, it should be appreciated by one skilled in the art that the display could also be a segmented display. In a segmented display, the electrodes may be fabricated in various shapes and disposed in desired orientations to generate desired image configurations, for example, in a segmented liquid crystal display short electrode segments may advantageously be disposed to create a seven segment numerical display. In other segmented displays electrode segments of irregular shape may be used to generate an icon on the display.

The bistable liquid crystal display 20 includes a layer 40 comprised of chiral nematic liquid crystal material which is advantageous in that it maintains its reflective state even in the absence of an electric field. The display 20 is preferably a passive matrix in which the horizontal (row) and vertical (column) electrode segments 37, 35, which define the image pixels of the display are passive, resistive circuit elements. The electrode segments may also comprise active circuit elements such as transistors, that is, circuitry for an active matrix display. A passive matrix display, such as the display 20, is advantageous because of lower cost compared to active matrix displays. Passive matrix displays have a much simpler design compared to active matrix displays and are thus easier to manufacture and can be produced in greater yields.

Figure 4:
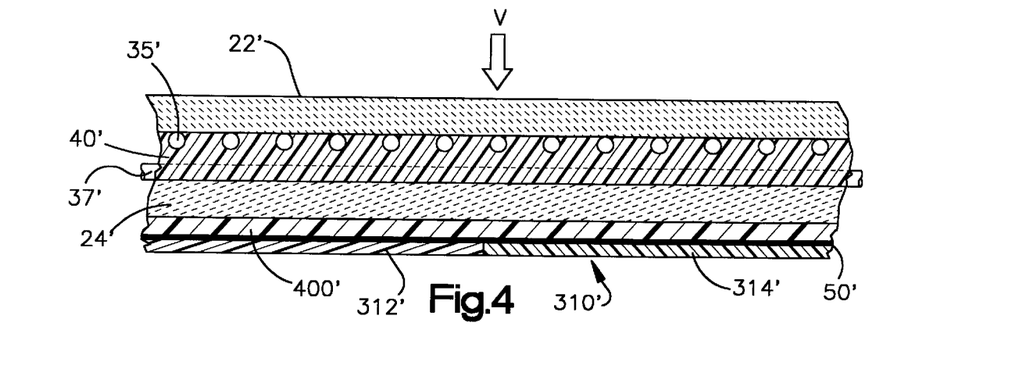
FIG. 4 is a sectional view of the display and solar cell assembly of FIG. 3 as seen from a plane indicated by the line 4—4 in FIG. 3.

The display 20 comprises the transparent rectangular front substrate 22 (closest to a viewer V of the display 20 viewing the display in a direction shown in the arrow in FIGS. 2 and 4) and the transparent rectangular back substrate 24. Between the substrates 22, 24 is disposed the thin layer of cholesteric liquid crystal material 40. The substrates 22, 24 may be formed preferably of glass (e.g., 0.5 millimeters (mm.) to 1.5 mm. thick) or of plastic (e.g., 0.18 mm. or approximately 7 mils thick), which materials are well known in the liquid crystal art. The liquid crystal material 40 may be filled into a cell spacing between substrates 22, 24 of, for example, from about 4 micrometers to about 6 $\mu$m. or to about 10 $\mu$m. or greater.

Sets of Display Electrodes 35, 37

The first substrate 22 includes a set of 640 column electrode segments 35 affixed to an inwardly facing surface 22a of the substrate 22, that is, the surface of the substrate facing or adjacent the liquid crystal material 40. Preferably, the set of column electrodes 35 comprise an array of parallel indium tin oxide (ITO) traces coated on the substrate inwardly facing surface 22a. The second substrate 24 includes a set of 480 row electrode segments 37 affixed to an inwardly facing surface 24a of the substrate 24. Preferably, the set of row electrodes 37 comprise an array of parallel ITO traces coated on the substrate inwardly facing surface 24a.

Display Driver Circuitry 200

Figure 5:
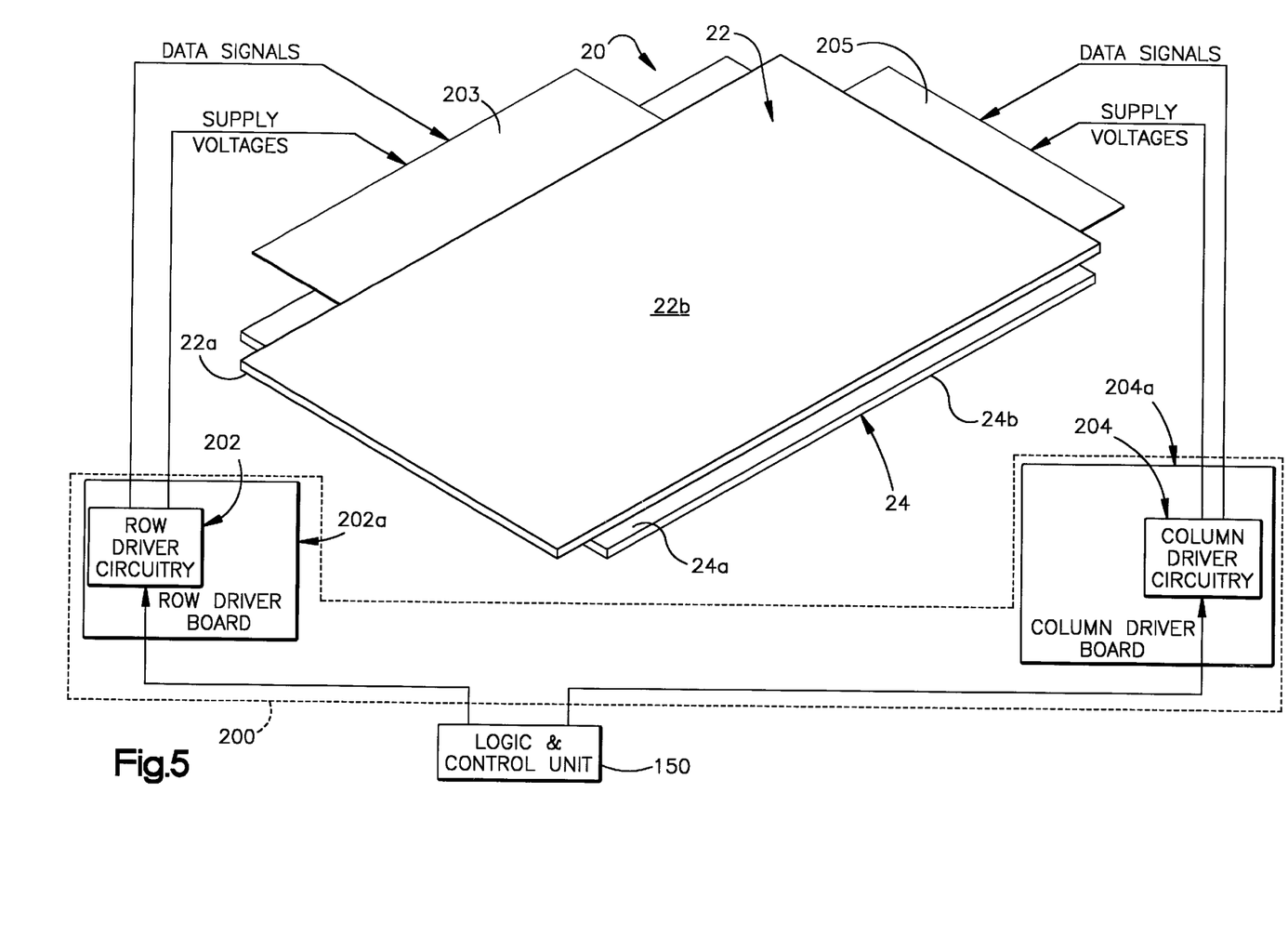
FIG. 5 is a schematic diagram of the display and solar cell assembly of FIG. 1 and a block diagram representation of display driver electronics connected to the display.

Display driver circuitry is shown schematically in FIGS. 5 and 6 at 200 and comprise a set of row driver circuitry (shown schematically at 202 mounted on a row driver board 202a) and a set of column driver circuitry (shown schematically at 204 mounted on a column driver board 204a). The set of row driver circuitry 202 is connected to the row electrodes 37. Likewise, the set of column driver circuitry 204 is connected to the column electrodes 35.

A full discussion of an appropriate drive scheme is disclosed in U.S. patent application Ser. No. 08/868,709, filed Jun. 4, 1997 and entitled "Cumulative Drive Scheme And Method For A Liquid Crystal Display". Application Ser. No. 08/868,709 is assigned to the assignee of the present invention and is incorporated herein in its entirety by reference. In the invention disclosed in U.S. patent application Ser. No. 09/063,907, filed Apr. 21, 1998, and entitled "Unipolar Waveform Drive Method And Apparatus For A Bistable Liquid Crystal Display," a method and display driver circuitry for activating a bistable, cholesteric liquid crystal display using unipolar waveforms and a pipelining scheme for addressing multiple rows of the display to provide high speed updating of the display is disclosed. Application Ser. No. 09/063,907 is assigned to the assignee of the present invention and is incorporated in its entirety herein by reference. Other suitable drive schemes for a cholesteric liquid crystal display are well known to those skilled in the art. It should be appreciated that the display 20 of the present invention is not limited to any particular drive scheme.

The row driver circuitry 202 is mounted on the row driver board 202a and has its output channels coupled to respective different row electrode segments 37 via suitable edge connections 203 (shown schematically in FIG. 5). Similarly, the column driver circuitry 204 is mounted on the column driver board 204a and has its output channels coupled to respective different column electrode segments 35 via suitable edge connections 205 (also shown schematically in FIG. 5).

The row and column driver circuitry 202, 204 is electrically connected to the logic and control unit 150 which includes circuitry that controls the presentation of data on the display 20 by controlling the reflectance state of each pixel in the array of 307,200 pixels that make up the display 20. A microprocessor controls operations of the circuitry of the control and logic unit 150.

Figure 3:
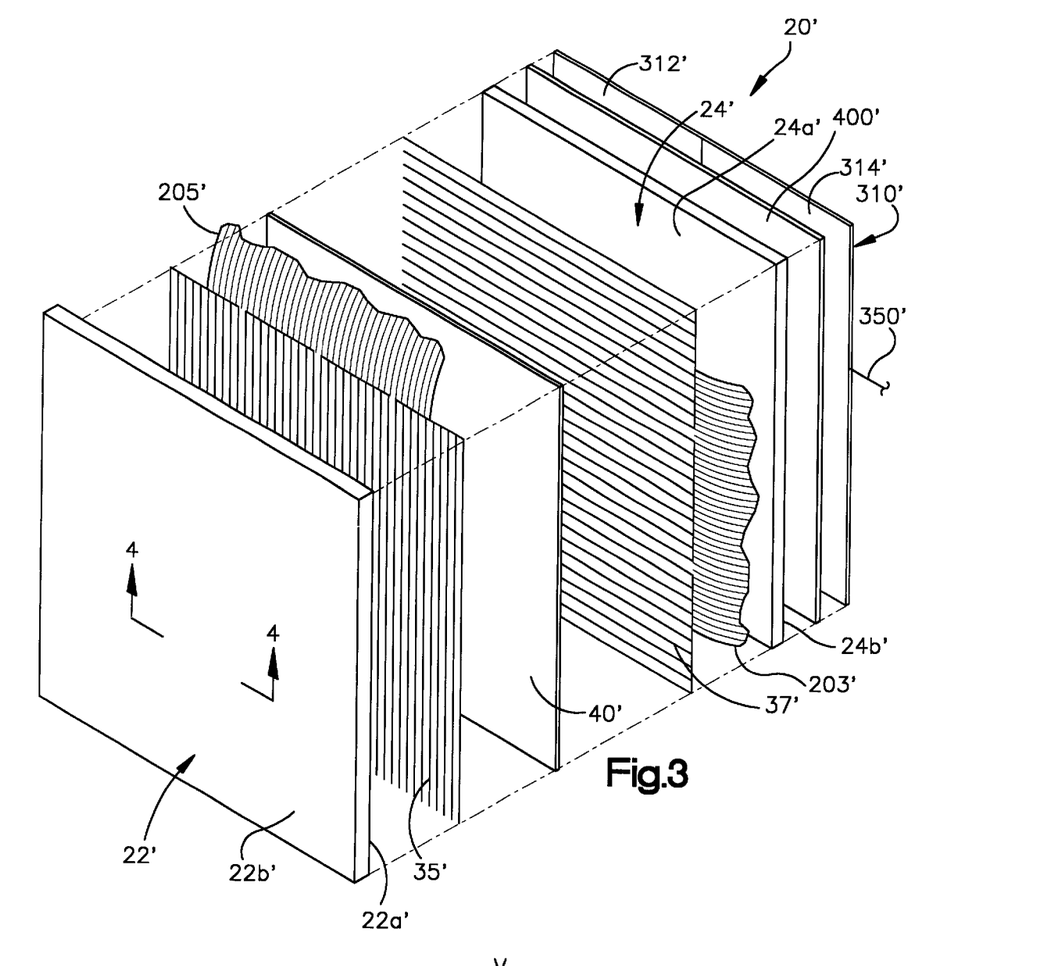
FIG. 3 is a schematic exploded perspective view of a second preferred embodiment of a bistable, cholesteric liquid crystal display and solar cell assembly of the present invention.
Figure 9:
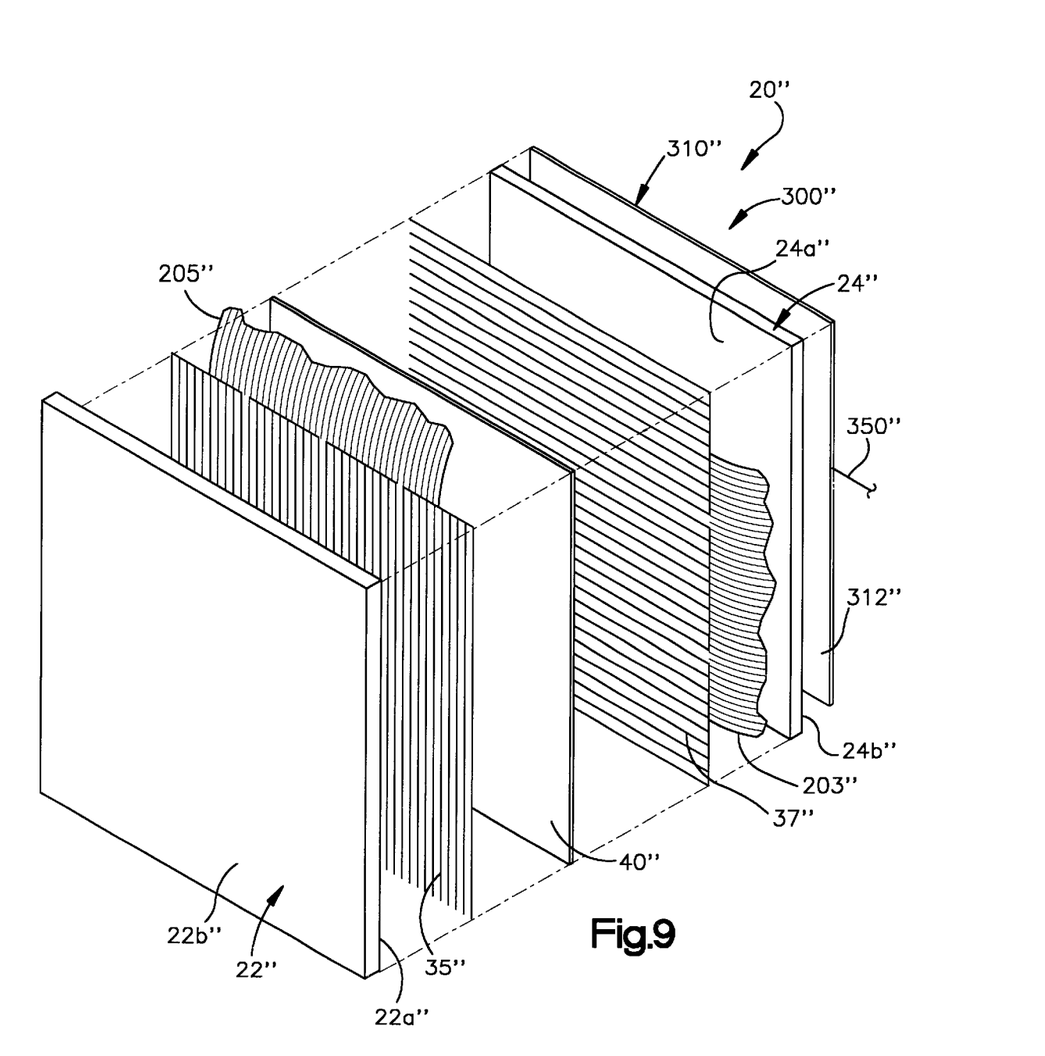
FIG. 9 is a schematic exploded perspective view of a third embodiment of a bistable, cholesteric liquid crystal display and solar cell assembly of the present invention.

First, Second, Third and Fourth Embodiments of the Display and Solar Cell Aassembly Three preferred embodiments of the display 20 include a first embodiment shown in FIGS. 1 & 2 (designated as 20), a second embodiment illustrated in FIGS. 3 & 4 (designated as 20') and a third embodiment illustrated in FIG. 9. Common reference numbers will be used for identical components in the three embodiments.

First Preferred Embodiment

In the first embodiment of the display 20, the solar panel assembly 310 of the solar cell assembly 300 is disposed adjacent an outwardly facing surface 24b of the second substrate 24 (away from the direction of the viewer V shown in FIG. 2). The solar panel assembly 310 is usually black in color and is light absorbing. The solar panel assembly 310 must be very dark or black in color so that image pixels of the display when in their non-reflective state appear as black or dark to the viewer V. For packaging considerations and maximum energy recovery, the solar panel assembly 310 selected should have a photovoltaic light receiving area that closely matches the display active area. Another important consideration is to select a solar cell assembly 300 whose voltage output is such that a minimum of circuitry will be needed to utilize the output voltage from the solar cell assembly 300 to charge the energy storage device 340.

It should be understood, of course, that the solar panel assembly 310 may be comprised of two (or more) solar cells electrically connected in series to increase the solar cell assembly output voltage. Given that for the VGA display 20 the display area is approximately 3.8×5 inches and because of the desired voltage output of the solar cell assembly 300 is at least 0.85 volts, a suitable solar panel assembly 310 would consist of two solar cells 312, 314 electrically connected in series. A suitable solar cell is part no. SP4-200-8 manufactured by Plastecs Company, P.O. Box 578, Webster, Mass. 01570 which is comprised or a single crystalline solar cell material and has an nominal voltage output of 0.5 volts, coupled in series the voltage output of the solar panel 310 is approximately 1.0 volt. The size of the aforementioned Plastecs' solar cell is 4"×4" and can be trimmed to a smaller size if desired. Thus, if each solar cell 312, 314 is trimmed to a size of approximately 3.8 inches×2.5 inches and appropriately positioned, the entire active display area subject to incident radiation will utilized to generate electrical energy from the solar cell assembly.

Ambient light incident on the outer surface 22b of the first substrate 22 of the display 20 passes through the first substrate 22, the liquid crystal material 40 and the second substrate 24 where it impinges upon the light absorbing solar panel assembly 310. Upon being exposed to incident light, the solar cells 312, 314 each generate output power whose magnitude is proportional to the intensity of incident light on the respective cells.

Preferably, a thin layer of index matching optical material 50 (FIG. 2) is applied between the solar panel assembly 310 and the back substrate 24 to provide suitable optical coupling and to reduce reflections at the substrate/solar cell interface. One suitable index matching optical material is glycerol, a high viscosity liquid with a refractive index near that of glass available from Aldrich Chemical Company, 1001 West Saint Paul Avenue, Milwaukee, Wis. 53233. Another suitable index matching optical material is optical adhesive such as Norland NOA 65 or NOA 72 manufactured by Norland Products, Inc., 695 Joyce Kilmer Avenue, New Brunswick, N.J. 08902. Yet another suitable index matching optical material is optical gel such as OC-440 or OCK-451 manufactured by Nye Lubricants, 12 Howland Road, Fairhaven, Mass. 02719.

A suitable energy storage device 340 is a nickel-cadmium (NiCd) rechargeable battery pack comprising two 1.2 volt NiCd battery cells connected in series and having an output voltage of 2.4 volts. Suitable NiCd batteries may be purchased from a number of battery vendors including Panasonic (e.g., Panasonic part no. P-25AAA). Other suitable rechargeable energy storage devices include capacitors and other types of rechargeable battery packs such a nickel-metal hydroxide (Ni—MH) battery pack comprising two Ni—MH rechargeable batteries (e.g., Panasonic part no. HHR-65TA with nominal 2.4 volt output) or lithium power cells such as lithium dioxide (Li—SO$_2$ having nominal 3.0 volt output).

If the voltage output of the solar cell assembly is increased the required capacitance will, of course, decrease exponentially in accordance with the formula E=½ CV$^2$.

Assuming the output voltage of the energy storage device 340 is 2.4 volts, the output of the solar cell assembly 300 must be stepped up to 2.4 volts or more to fully charge the energy storage device 340. Given that the output of the solar panel is 1.0 volt (0.5 volt from each of the solar cells 312, 314), a DC/DC voltage converter must be used to step up the voltage from 1.0 volts to 2.4 volts. As such, the solar panel assembly 310 is electrically coupled though a DC/DC voltage converter 320 and a diode 330 to the rechargeable energy storage device 340. An electrical conductor 350 (seen in FIG. 1) electrically couples power generated by the solar panel assembly 310 to the voltage converter 320.

The DC/DC converter 320 boosts the solar panel output voltage (1.0 volts) to a voltage greater than the output voltage rechargeable energy source 340, e.g., 2.4 volts. A suitable DC/DC converter is Maxim product no. MAX866 available from Maxim Electronics, 120 San Gabriel Drive, Sunnyvale Calif. 94086. The MAX866 is a 3.3V/5V or adjustable output, single cell DC/DC converter that steps up DC voltage from a minimum of 0.8 volts to 3.3 volts or 5 volts (pin selectable) utilizing a 330 $\mu$H inductor, a 47 $\mu$F and a 0.22 $\mu$F capacitors. Another suitable DC/DC converter is the MAX1642 also sold by Maxim Electronics which steps up DC voltage from a range of 0.7 volts to 1.65 volts to a range of 2.0 volts to 5.2 volts output utilizing an inductor and two capacitors. An alternative to using a voltage converter to step up the solar panel output voltage is to electrically couple in series the requisite number of solar cells in series to generate the desired output voltage which exceed the energy storage device output voltage. For example if each solar cell has an output of 0.5 volts, coupling five in series would result in an output voltage of 2.5 volts, sufficient to charge the 2.4 volt energy source 340. The disadvantage of this method is that five solar cells have to be purchased, trimmed as required and electrically coupled.

The diode 330 (FIG. 6) restricts the flow of current from the DC/DC voltage converter 320 to the energy storage device 340 and prevents current from the energy storage device 340 from flowing to the solar panel assembly 310 when the display 20 is exposed to no or low ambient illumination. It should be noted that depending on the nature of the solar cells selected, the diode 330 may not be required since certain types of solar cells perform the functionality of the diode as a result of the specific internal silicon structure of the solar cell material.

The energy storage device 340 is required since the solar cell assembly 300 is typically not capable of supplying enough energy to allow the display driver circuitry 200 to continuously update the display image. Furthermore, even if the display 20 does not require continuous updating, the energy storage device 340 permits the display 20 to be operated during periods of darkness. It should be understood, of course, that the display 20 may be driven directly from the electrical power generated by the solar cell assembly 300 if continuous updating and low light operation is not a requirement.

Figure 7:
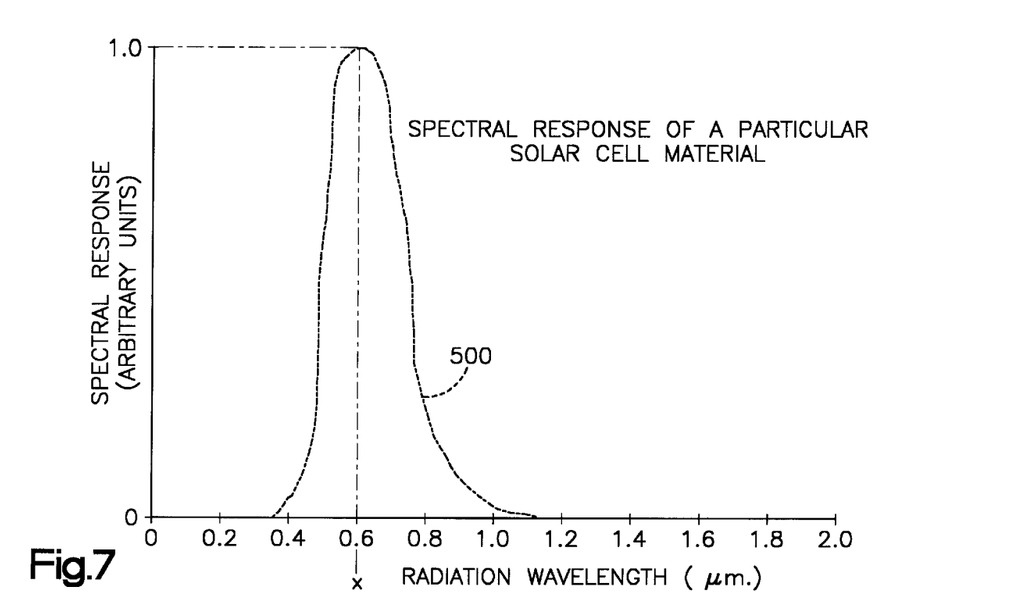
FIG. 7 is a schematic representation of a graph illustrating the spectral response of a particular solar cell material.

With regard to the selection of a solar cell, it should be understood that the spectral response of different solar cell materials differ. The spectral response or sensitivity of a solar cell material can be viewed as a plot of the efficiency of the solar cell material in converting incident radiation to electric energy as a function of radiation wavelength. A typical solar cell material spectral response is schematically illustrated at 500 in FIG. 7. Generally, the spectral response of a solar cell material is a approximately a bell shaped curve or normal distribution as can be seen in FIG. 7. The graph indicates that for this particular single crystalline solar cell material, the greatest spectral responsiveness and, therefore, the greatest efficiency in conversion of electromagnetic energy into electrical energy, occurs at an incident radiation wavelength labeled X in FIG. 7 of about 0.6 $\mu$m. Since different solar cell materials will have different values of X, the greatest spectral responsiveness wavelength, if it can be determined in advance the lighting condition or conditions which a display will generally be used in, it would be possible to select the most efficient solar cell material for the expected lighting conditions under which the display will be used. For example, in an florescent light environment, the emitted radiation centers around 0.45 $\mu$m. For a display used exclusively in such an environment, it would be best to use a solar cell material with an X=0.45 $\mu$m. For a display used in an outdoor sunlight environment, the solar cell material should have a greater X value since the radiation wavelengths of sunlight center around a value higher than 0.45 $\mu$m.

Second Preferred Embodiment

In the second embodiment of the display denoted as 20' in FIGS. 3 & 4, a thin infrared (IR) transmissive layer 400' is coated on the outwardly facing surface 24b' (FIG. 3) of the second or back substrate 24'. Two solar cells 312', 314' of a solar panel assembly 310' of the solar cell assembly 300' are positioned adjacent the second substrate outwardly facing surface 24b'. Since the IR transmissive layer 400' is dark in color to provide contrast for non-reflecting image pixels versus reflecting image pixels, the solar cells 312', 314' of the solar panel assembly 310' may be any color. A suitable IR transmissive layer or coating 400' is 40E black ink manufactured by Excelsior Marking Products, Inc., 4524 Hudson Drive, Stow, Ohio 44224. The IR coating 400' may be flow coated, dipped or sprayed onto the second substrate outwardly facing surface 24b'. Spraying of the IR coating 400' may be accomplished using a Preval power spray unit manufactured by Preval Sprayer Division, Precision Valve Corporation, P.O. Box 309, Yonkers, N.Y. 10702.

Figure 8:
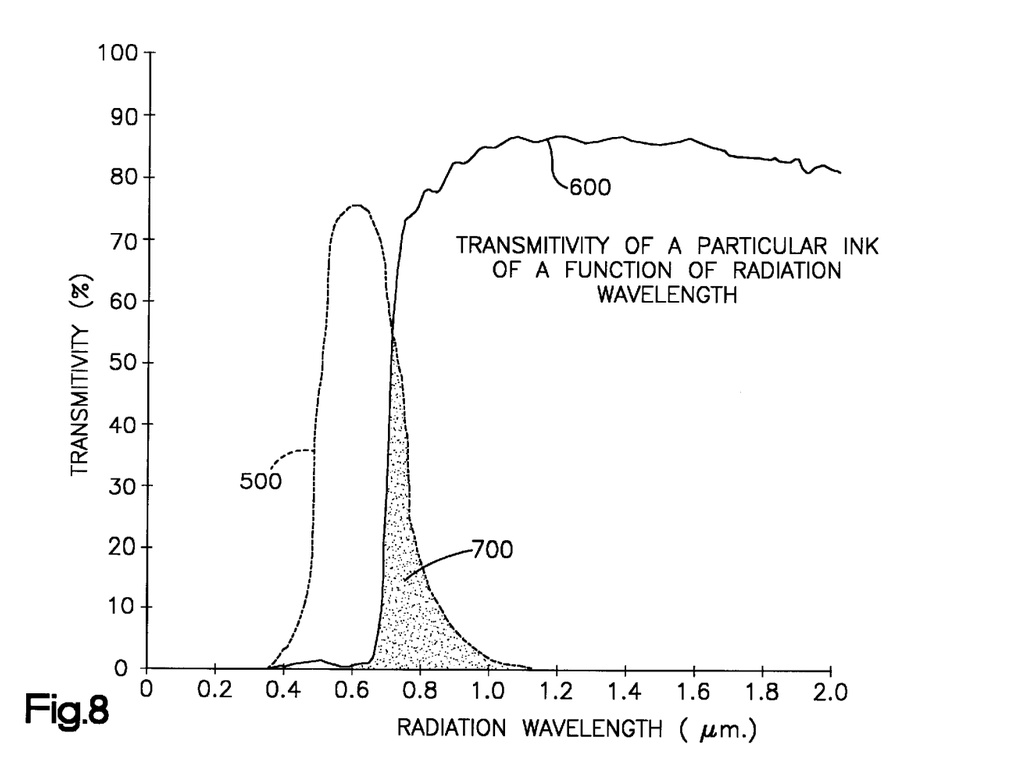
FIG. 8 is a schematic representation of a graph illustrating the transmitivity of a infrared (IR) transmissive ink utilized in an IR transmissive layer or coating of the display.

Other than the utilization of the IR transmissive layer 400', the operation of the display 20' and the operation and advantages of the solar cell assembly of the display 20' are identical to that described in the first embodiment (i.e., the display 20). The presence of the IR transmissive layer 400' reduces solar energy recovery by the solar energy cell 310' by about 25–98% depending on the wavelength of light. FIG. 8 illustrates this concept. The transmitivity of radiation through the IR coating layer 400' exhibits a generally step type function labeled as 600 in FIG. 8, the exact functional relationship is dependent on the particular characteristics of the IR ink selected as the coating. For this particular IR transmissive layer 400' it can be seen that for radiation having a wavelength below 0.7 $\mu$m., a very small percentage of the incident radiation is transmitted through the layer 400' while at wavelengths above 0.8 $\mu$m. about 80–85% of the incident radiation is transmitted through the layer 400'. It is clear that a solar cell material having a higher spectral response radiation wavelength center value (X) is very desirable so that the intersection region (labeled 700 in FIG. 8) between the IR transmitivity function and the solar cell material spectral response curve 500 is as great as possible.

Thus, the second embodiment of the display 20' is less efficient from the perspective of utilization of solar energy compared to the display 20 (first embodiment). However, those skilled in the art will realize, in view of this disclosure, that other IR transmissive materials having the ability to transmit a greater proportion of the near IR radiation (radiation having a wavelength of 0.75 $\mu$m. to 1.5 $\mu$m.) incident thereon, as well as solar cells having a greater efficiency in converting radiation to electrical energy in this radiation wavelength region, may be used in accordance with the present invention. Preferably, a thin layer of index matching optical material 50' (FIG. 4) is applied between the IR coating 400' and the solar panel assembly 310' to provide suitable optical coupling and to reduce reflections at the substrate/solar cell interface.

Third Preferred Embodiment

It should be appreciated that if solar cell or cells of the solar cell assembly and a substrate or base material are integrated into a single unit such a unit may advantageously function as both the solar panel assembly and the second or back substrate of the display thereby eliminating the need for a back substrate separate from the solar panel assembly. A third preferred embodiment of the display 20" of the present invention employs such a construction and is shown in FIG. 9. The display 20" includes a solar cell assembly 300" that includes a solar panel assembly 310" that also functions as the back substrate. The solar panel assembly 310" includes a solar cell comprising a layer of photovoltaic material 312" applied to an outwardly facing surface 24b" of the base material 24" comprising the solar cell. The photovoltaic material 312" may be silicon or other types of material such as organic solar cell material. The base material 24" may be comprised of either a plastic or glass base material. The solar cell assembly 300" also includes a suitable electrode array 37" applied to an inwardly facing surface 24a" of the base material 24". Preferably, the electrode array 37" consists of an array of parallel indium tin oxide (ITO) traces comprising a set of row electrode segments 37" coated on the base material inwardly facing surface 24a", as described in the first two embodiments. Alternatively, if it is desired that the display 20" be configured as an active matrix display, a matrix of silicon transistors would be applied to the inwardly facing surface of the base material 24" to construct an actively driven display, as is well known in the art of fabricating active and passive matrix displays. It should be appreciated that the same active matrix structure applied to the back substrate could be utilized in all four embodiments if an active matrix display is desired.

In one preferred method of fabricating the solar cell assembly 300" of the third embodiment, the solar panel assembly 310" consists of photovoltaic material 312" applied to the outwardly facing surface 24b" of the glass or plastic base material 24" such that the photovoltaic material 312" is originally fabricated upon the base material. Suitable thin film solar cells may purchased from Photon Technologies, Inc., P.O. Box 790, Severna Park Md. 21146. If glass is selected as the base material for the base material 24", a suitable thin film solar cell would be the ASE 3.0 V, 27 mA amorphous, thin film solar cell. If plastic is selected as the base material 24", a suitable thin film solar cell would be a 3.0 V, 40–50 mA thin film solar cell. In the event that the solar panel assembly 310" is not black or dark colored when the inwardly facing surface 24a" is viewed by a viewer of the display 20", an IR transmissive layer or coating (not shown) may be applied to the inwardly facing surface 24a" of the solar panel assembly 310" to provide a dark color background and thereby improving display contrast. Of course, such an IR transmissive layer has the disadvantage of filtering or blocking radiation in the visible spectrum thereby preventing such radiation from reaching the silicon of the solar cell. As was described in the second embodiment, this filtering decreases the radiation energy available for conversion to electrical energy by the solar cell.

Fourth Preferred Embodiment

Figure 10:
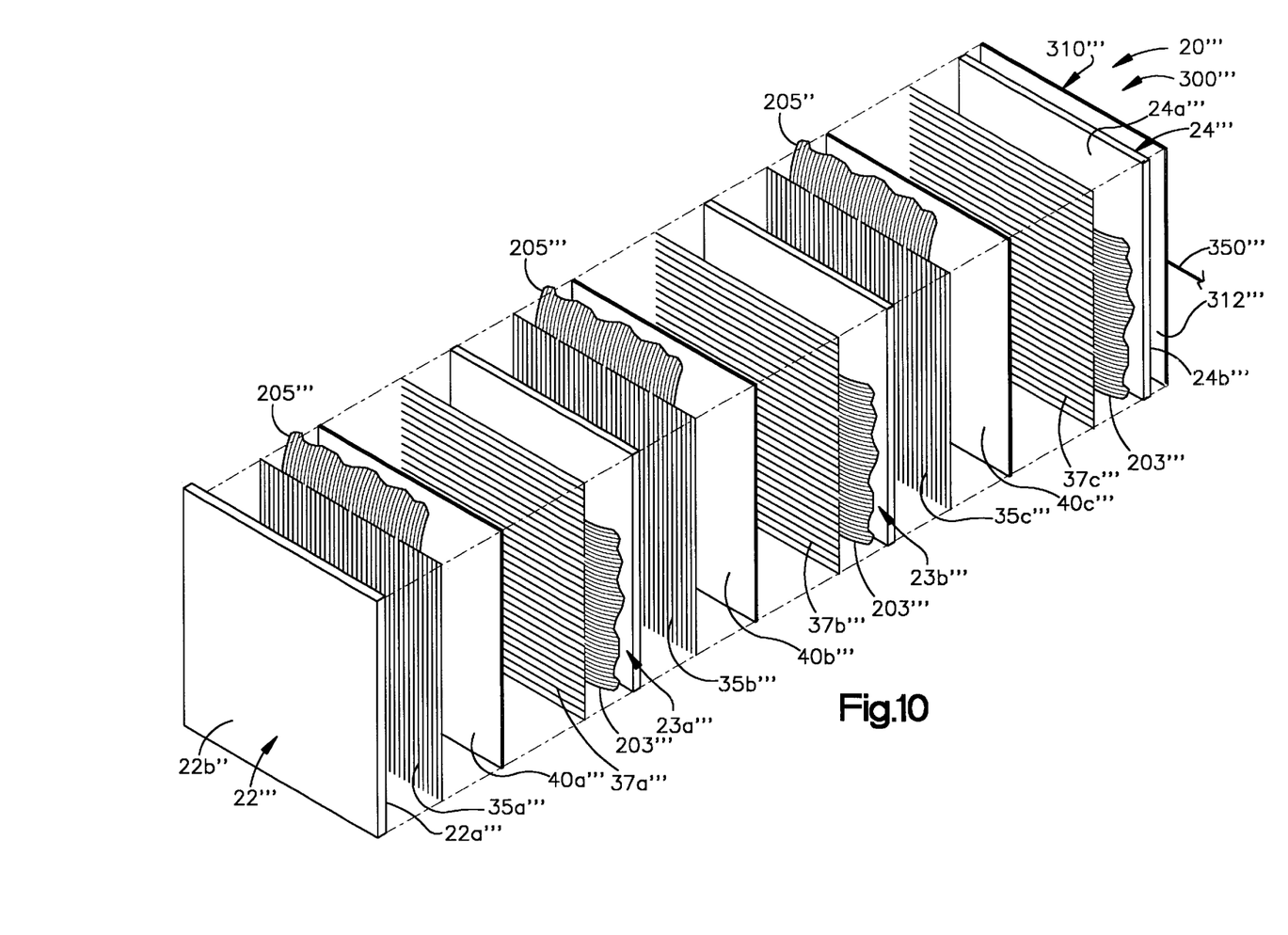
FIG. 10 is a schematic exploded perspective view of a fourth embodiment of a stacked, bistable, cholesteric liquid crystal display and solar cell assembly of the present invention.

In a fourth preferred embodiment, the display 20''' is a stacked cholesteric liquid crystal display including a solar cell assembly 300''' constructed in accordance with either the first, second or third embodiments described above. As can be seen in FIG. 10, the display consists of three layers of liquid crystal material 40a''', 40b''', 40c''' and associated substrates 22''', 23a''', 23b''', 24'''. The layer of liquid crystal material 40a''' is bounded by the substrates 22''', 23a'''. The layer of liquid crystal material 40b''' is bounded by the substrates 23a''', 23b'''. The layer of liquid crystal material 40c''' is bounded by the substrate 23b''' and a solar panel assembly 310''' of the solar cell assembly 300'''. The solar panel assembly 310''' includes a base material 24''' which functions as the back substrate. The solar panel assembly 310''' includes a solar cell comprising a layer of photovoltaic material 312''' applied to an outwardly facing surface 24b''' of the base material 24''' comprising the solar cell. The photovoltaic material 312''' may be silicon or other types of material such as organic solar cell material. The base material 24''' may be comprised of either a plastic or glass base material.

Alternatively, the solar cell assembly 300''' of the display''' may comprise either of the structures of the solar cell assemblies 300 or 300' described with respect to the first and second embodiments of the display of the present invention. The solar cell assembly 300''' also includes a suitable electrode array 37c''' applied to an inwardly facing surface 24a''' of the base material 24'''. Preferably, the electrode array 37c''' consists of an array of parallel indium tin oxide (ITO) traces comprising a set of row electrode segments coated on the base material inwardly facing surface 24a''', as described in the first three embodiments. A vertical electrode array 35a''' is applied to an inwardly facing surface 22a''' of the front substrate 22'''. A horizontal electrode array 37a''' is applied to one side of the substrate 23a''' facing the front substrate 22''' and a vertical electrode array 35b''' is applied to the opposite side of the substrate 23a''' facing the substrate 23b'''. A horizontal electrode array 37b''' is applied to one side of the substrate 23b''' facing the substrate 23a''' and a vertical electrode array 35c''' is applied to the opposite side of the substrate 23b''' facing the back substrate 24'''.

Alternatively, if it is desired that the display 20''' be configured as an active matrix display, a matrix of silicon transistors would be applied to the frontwardly or forwardly facing surfaces of substrate 23a''', 23b''', 24''' (namely 24a''') to construct an actively driven display, as is well known in the art of fabricating active and passive matrix displays. The method of fabricating the solar cell assembly 300''' may be any of the methods described in the third embodiment.

The stacked cholesteric liquid crystal display 20''' is a color display, the cholesteric liquid crystal material layers 40a''', 40b''', 40c''' are appropriately selected to have respective pitch lengths to reflect wavelengths of light in the red, green, and blue portions of the visible spectrum respectively. Thus, color of an image pixel visible to a viewer of the display 20''' results from an additive color mix of the colors reflected by the three aligned pixels of the first second and third liquid crystal material layers that together comprise the image pixel seen by a viewer of the display 20'''. U.S. patent application Ser. No. 08/823,329, filed on Mar. 22, 1997 and entitled "Display Device Reflecting Visible and Infrared Radiation," Ser. No. 09/330,104, filed on Jun. 10, 1999 and entitled "Stacked Color Liquid Crystal Display Device," and Ser. No. 09/329,587, filed on Jun. 10, 1999 and entitled "Stacked Color Liquid Crystal Display Device," respectively disclose a stacked liquid crystal display providing for a multi-color display. Application Ser. Nos. 08/823,329, 09/330,104, and 09/329,587 are assigned to the assignee of the present invention and each is incorporated herein in its respective entirety by reference.

Even if a color display is not required, the display 20''' may be configured in a stacked display, for example, as a double stacked display (two layers of liquid crystal material). Such a double stacked configuration has the advantage of providing enhanced brightness for image pixels in the reflective state. A double stacked display is disclosed in U.S. application Ser. No. 09/244,731, filed Feb. 5, 1999 and entitled "Stacked Bistable Cholesteric Liquid Crystal Display Utilizing Single Set of Drive Electronics." Application Ser. No. 09/244,731 is assigned to the assignee of the present invention and is incorporated herein in its entirety by reference.

While the invention has been described herein in it currently preferred embodiment or embodiments, those skilled in the art will recognize that other modifications may be made without departing from the invention and it is intended to claim all modifications and variations as fall within the scope of the invention.

What is claimed is:

1. A liquid crystal display comprising:
    a) a layer of reflective chiral nematic liquid crystal material;
    b) first substrate and a spaced apart second substrate, an inner surface of the first substrate and an inner surface of the second substrate bounding said liquid crystal material layer, the first substrate being closer than the second substrate to a viewer of the display,
    c) a first set of conductive electrodes disposed on the inner surface of the first substrate and a second set of conductive electrodes spaced apart from the first set of electrodes and disposed on the inner surface of the second substrate bounding said liquid crystal material layer;
    d) display driver circuitry electrically coupled to the first and the second set of conductive electrodes for generating desired voltage differentials between electrodes of the first set of conductive electrodes and electrodes of the second set of conductive electrodes; and
    e) a solar cell assembly including a solar cell positioned adjacent said second substrate and electrically coupled to the display driver circuitry, the solar cell receiving illumination passing through the first substrate and said liquid crystal material and converting said illumination to electrical energy to supply power to an energy storage device.

2. The liquid crystal display of claim 1 wherein the energy storage device is electrically coupled to the display driver circuitry and power supplied to the energy storage device is used to provide power to the display driver circuitry.

3. The liquid crystal display of claim 1 wherein the solar cell is disposed adjacent an outer surface of the second substrate.

4. The liquid crystal display of claim 3 wherein a layer of index matching optical material is provided between the solar cell and the second substrate.

5. The liquid crystal display of claim 1 wherein the solar cell is comprised of single crystalline material.

6. The liquid crystal display of claim 2 wherein the solar cell assembly includes a diode disposed between the solar cell and the energy storage device such that electrical current flows only in a direction from the solar cell to the energy storage device.

7. The liquid crystal display of claim 1 wherein the first and second substrates are comprised of glass.

8. The liquid crystal display of claim 1 wherein a layer of infrared radiation absorbing material is disposed between the solar cell and the outer surface of the second substrate.

9. The liquid crystal display of claim 1 wherein said first set of electrodes comprise a plurality of substantially parallel electrode segments and said second set of electrodes comprise a plurality of substantially parallel electrode segments, said first set of electrodes extending transverse to said second set of electrodes.

10. The liquid crystal display of claim 1 wherein the energy storage device is a rechargeable battery.

11. The liquid crystal display of claim 1 wherein the solar cell assembly includes a DC/DC voltage converter to increase a magnitude of voltage output to the drive circuitry.

12. A liquid crystal display comprising:
    a) a layer of reflective chiral nematic liquid crystal material;
    b) first substrate and a spaced apart second substrate, an inner surface of the first substrate and an inner surface of the second substrate bounding said liquid crystal material layer, the first substrate being closer than the second substrate to a viewer of the display;
    c) a first set of conductive electrodes disposed on the inner surface of the first substrate and a second set of conductive electrodes spaced apart from the first set of electrodes and disposed on the inner surface of the second substrate bounding said liquid crystal material layer;
    d) display driver circuitry electrically coupled to the first and the second set of conductive electrodes for generating desired voltage differentials between electrodes of the first set of conductive electrodes and electrodes of the second set of conductive electrodes; and
    e) a solar cell assembly including a solar cell at least of portion of which is positioned on a side of the liquid crystal material away from the first substrate and electrically coupled to the display driver circuitry, the solar cell receiving illumination passing through the first substrate and said liquid crystal material and converting said illumination to electrical energy to supply power to an energy storage device.

13. The liquid crystal display of claim 12 wherein the energy storage device is electrically coupled to the display driver circuitry and power supplied to the energy storage device is used to provide power to the display driver circuitry.

14. The liquid crystal display of claim 12 wherein said portion of the solar cell is disposed adjacent the second substrate.

15. The liquid crystal display of claim 14 wherein the solar cell is disposed adjacent an outer surface of the second substrate.

16. The liquid crystal display of claim 15 wherein a layer of index matching optical material is provided between the solar cell and the second substrate.

17. The liquid crystal display of claim 1 wherein the solar cell is comprised of a single crystalline material.

18. The liquid crystal display of claim 12 wherein the solar cell assembly includes a diode disposed between the solar cell and the energy storage device such that current flows only in a direction from the solar cell to the energy storage device.

19. The liquid crystal display of claim 12 wherein the first and second substrates are comprised of glass.

20. The liquid display of claim 12 wherein a layer of infrared radiation absorbing material is disposed between the solar cell and the outer surface of the second substrate.

21. The liquid crystal display of claim 12 wherein said first set of electrodes comprise a plurality of substantially parallel electrode segments and said second set of electrodes comprise a plurality of substantially parallel electrode segments, said first set of electrodes extending transverse to said second set of electrodes.

22. The liquid crystal display of claim 12 wherein the energy storage device is a rechargeable battery.

23. The liquid crystal display of claim 12 wherein the solar cell assembly includes a DC/DC voltage converter to increase a magnitude of voltage output to the drive circuitry.

24. A liquid crystal display device comprising chiral nematic liquid crystal material, cell wall structure communicating with said liquid crystal material to form focal conic and reflective planar textures that are stable in the absence of an electric field, a solar cell device for converting electromagnetic radiation that has passed through said liquid crystal material into electrical energy, and means for applying an electrical field to said liquid crystal material to place at least a portion thereof into at least one of the focal conic and planar textures.

25. The display device of claim 24 wherein said cell wall structure comprises substrates between which said liquid crystal material is disposed.

26. The display device of claim 25 wherein said solar cell device comprises a panel composed of silicon disposed adjacent and downstream one of said substrates relative to a direction of incident radiation through said liquid crystal material.

27. The display device of claim 26 comprising a layer of at least one of visible light absorbing and infrared transmissive material disposed between said one substrate and said panel.

28. The display device of claim 27 wherein said layer allows the passage of infrared radiation therethrough.

29. The display device of claim 24 where said liquid crystal material has a pitch length effective to reflect visible light.

30. The display device of claim 29 wherein said liquid crystal material has a pitch length effective to reflect infrared radiation.

31. The display device of claim 24 wherein said cell wall structure bounds a first region of liquid crystal material having a pitch length effective to reflect visible light and a second region of liquid crystal material having a pitch length effective to reflect infrared radiation.

32. The display device of claim 25 comprising at least two layers of said liquid crystal material disposed between said substrates and isolated from communication with one another.

33. The display device of claim 32 wherein said liquid crystal material in said layers has a pitch length effective to reflect visible light.

34. A liquid crystal display comprising:
a) a layer of reflective chiral nematic liquid crystal material;
b) first substrate and a spaced apart second substrate, an inner surface of the first substrate and an inner surface of the second substrate bounding said liquid crystal material layer, the first substrate being closer than the second substrate to a viewer of the display;
c) display driver circuitry for changing a reflective state of selected image pixels of the display, the image pixels associated with respective different regions of the liquid crystal material layer; and
e) the second substrate comprising at least one solar cell electrically coupled to the display driver circuitry, the at least one solar cell receiving illumination passing through the first substrate and said liquid crystal material and converting said illumination to electrical energy to supply power to the display driver circuitry.

35. The liquid crystal display of claim 34 further including an energy storage device coupled to and providing power to said display driver circuitry, the at least one solar cell electrically coupled to and supplying power to said energy storage device.

36. The liquid crystal display of claim 34 wherein the display further includes a first set of conductive electrodes disposed on the inner surface of the first substrate and a second set of conductive electrodes spaced apart from the first set of electrodes and disposed on the inner surface of the second substrate bounding said liquid crystal material layer and the display driver circuitry is electrically coupled to the first and the second set of conductive electrodes for generating desired voltage differentials between electrodes of the first set of conductive electrodes and electrodes of the second set of conductive electrodes, the image pixels being defined by regions of the liquid crystal material layer adjacent intersections of the first set of conductive electrodes and the second set of conductive electrodes, a reflective state of an image pixel being dependent upon a voltage differential between an electrode of the first set of conductive electrodes and an electrode of the second set of conductive electrodes associated with the image pixel.

37. The liquid crystal display of claim 34 wherein the first and second substrates are comprised of glass.

38. The liquid crystal display of claim 36 wherein said first set of electrodes comprise a plurality of substantially parallel electrode segments and said second set of electrodes comprise a plurality of substantially parallel electrode segments, said first set of electrodes extending transverse to said second set of electrodes.

39. A liquid crystal display comprising:
a) a plurality of layers of reflective chiral nematic liquid crystal material;
b) a plurality of spaced apart substrates bounding the plurality of liquid crystal material layers, a back substrate being positioned furthest from a viewer of the display;
c) display driver circuitry for changing a reflective state of aligned portions of the plurality of liquid crystal material layers comprising an image pixel; and
d) a solar cell assembly including a solar cell disposed on the back substrate and electrically coupled to the display driver circuitry, the solar cell receiving illumination passing through the plurality of spaced apart substrates and the plurality of liquid crystal material layers and converting said illumination to electrical energy to supply power to the display driver circuitry.

40. A liquid crystal display device comprising:
chiral nematic liquid crystal material;
cell wall structure confining said liquid crystal material;
display driver circuitry for generating voltage differentials across said liquid crystal material effective to place said liquid crystal material into at least one of focal conic and planar textures; and
a photovoltaic cell positioned so as to receive electromagnetic radiation passing through said liquid crystal material for converting said radiation into electrical energy.

41. The liquid crystal display device of claim 40 wherein said display device has no polarizer.

42. The liquid crystal display device of claim 41 wherein said display device has no reflector.

43. The liquid crystal display device of claim 40 comprising a layer of material disposed between said liquid crystal material and said photovoltaic cell which restricts reflection toward said liquid crystal material while permitting passage of electromagnetic radiation to said photovoltaic cell.

44. The liquid crystal display device of claim 40 comprising a plurality of electrodes disposed on said cell wall structure and bounding said liquid crystal material, said electrodes being electrically coupled to said display driver circuitry.

45. The liquid crystal display of claim 40 comprising a plurality of electrodes and transistors disposed on said cell wall structure and bounding said liquid crystal material, said electrodes and said transistors being electrically coupled to said display driver circuitry.

46. The liquid crystal display device of claim 40 comprising an energy storage device electrically coupled to said photovoltaic cell for receiving the electrical energy generated by said photovoltaic cell.

47. A liquid crystal display device comprising:

chiral nematic liquid crystal material;

cell wall structure confining said liquid crystal material, said cell wall structure communicating with said liquid crystal material to form focal conic and planar textures that are stable In the absence of an electric field, said cell wall structure comprising a transparent front substrate near an external front surface of said display device;

display driver circuitry for generating voltage differentials across said liquid crystal material effective to form an image that is displayed through said transparent front substrate to a viewer; and a photovoltaic cell positioned behind said liquid crystal material so as not to occupy the external front surface of said display device effective to receive electromagnetic radiation passing through said liquid crystal material for converting said radiation into electrical energy.

48. The liquid crystal display device of claim 47 wherein said display device has no polarizer.

49. The liquid crystal display device of claim 47 comprising a layer of material disposed between said liquid crystal material and said photovoltaic cell which restricts reflection toward said liquid crystal material while permitting passage of electromagnetic radiation to said photovoltaic cell.

50. The liquid crystal display device of claim 47 comprising an energy storage device electrically coupled to said photovoltaic cell for receiving the electrical energy generated by said photovoltaic cell.

* * * * *